(12) United States Patent
Wang et al.

(10) Patent No.: US 8,637,130 B2
(45) Date of Patent: Jan. 28, 2014

(54) MOLDED PARTS CONTAINING A POLYLACTIC ACID COMPOSITION

(75) Inventors: James H. Wang, Appleton, WI (US); Gregory J. Wideman, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/370,975

(22) Filed: Feb. 10, 2012

(65) Prior Publication Data

US 2013/0209715 A1 Aug. 15, 2013

(51) Int. Cl.
*B29D 22/00* (2006.01)

(52) U.S. Cl.
USPC ............. 428/35.7; 525/190; 525/186; 525/64

(58) Field of Classification Search
USPC ............................ 428/35.7; 525/64, 186, 190
See application file for complete search history.

(56) References Cited

U.S. PATENT DOCUMENTS

| | | |
|---|---|---|
| 3,338,992 A | 8/1967 | Kinney |
| 3,341,394 A | 9/1967 | Kinney |
| 3,650,649 A | 3/1972 | Schippers |
| 3,692,618 A | 9/1972 | Dorschner et al. |
| 3,726,955 A | 4/1973 | Hughes et al. |
| 4,055,702 A | 10/1977 | Guthrie et al. |
| 4,707,398 A | 11/1987 | Boggs |
| 4,797,468 A | 1/1989 | De Vries |
| 4,937,299 A | 6/1990 | Ewen et al. |
| 5,057,368 A | 10/1991 | Largman et al. |
| 5,069,970 A | 12/1991 | Largman et al. |
| 5,108,820 A | 4/1992 | Kaneko et al. |
| 5,162,074 A | 11/1992 | Hills |
| 5,218,071 A | 6/1993 | Tsutsui et al. |
| 5,266,610 A | 11/1993 | Malhotra et al. |
| 5,272,236 A | 12/1993 | Lai et al. |
| 5,277,976 A | 1/1994 | Hogle et al. |
| 5,278,272 A | 1/1994 | Lai et al. |
| 5,317,059 A | 5/1994 | Chundury et al. |
| 5,322,728 A | 6/1994 | Davey et al. |
| 5,336,552 A | 8/1994 | Strack et al. |
| 5,382,400 A | 1/1995 | Pike et al. |

(Continued)

FOREIGN PATENT DOCUMENTS

| | | |
|---|---|---|
| EP | 1054085 A1 | 11/2000 |
| EP | 1361039 A1 | 11/2003 |

(Continued)

OTHER PUBLICATIONS

Abstract of Japanese Patent—JP2010280921 dated Dec. 16, 2010, 1 page.

(Continued)

*Primary Examiner* — N. Edwards
(74) *Attorney, Agent, or Firm* — Dority & Manning, P.A.

(57) ABSTRACT

A molded part that is formed from a thermoplastic composition that contains a polylactic acid, propylene/α-olefin copolymer, and a polyolefin compatibilizer is provided. The propylene/α-olefin copolymer can be dispersed as discrete physical domains within a continuous matrix of the polylactic acid. Without intending to be limited by theory, it is believed that the discrete domains can help resist the expansion of the composition during a molding operation, which minimizes the degree of expansion experienced by the composition during molding in comparison to conventional polylactic acid compositions.

18 Claims, 1 Drawing Sheet

(56) References Cited

U.S. PATENT DOCUMENTS

| | | | |
|---|---|---|---|
| 5,466,410 A | 11/1995 | Hills | |
| 5,470,944 A | 11/1995 | Bonsignore | |
| 5,472,775 A | 12/1995 | Obijeski et al. | |
| 5,502,158 A | 3/1996 | Sinclair et al. | |
| 5,539,056 A | 7/1996 | Yang et al. | |
| 5,571,619 A | 11/1996 | McAlpin et al. | |
| 5,596,052 A | 1/1997 | Resconi et al. | |
| 5,686,531 A | 11/1997 | Engelke et al. | |
| 5,714,573 A | 2/1998 | Randall et al. | |
| 5,770,682 A | 6/1998 | Ohara et al. | |
| 5,807,490 A | 9/1998 | Davis et al. | |
| 5,821,327 A | 10/1998 | Oota et al. | |
| 5,844,067 A | 12/1998 | Erneta | |
| 5,880,254 A | 3/1999 | Ohara et al. | |
| 5,883,199 A | 3/1999 | McCarthy et al. | |
| 5,939,467 A | 8/1999 | Wnuk et al. | |
| 6,117,928 A | 9/2000 | Hiltunen et al. | |
| 6,153,138 A | 11/2000 | Helms, Jr. et al. | |
| 6,200,669 B1 | 3/2001 | Marmon et al. | |
| 6,235,825 B1 | 5/2001 | Yoshida et al. | |
| 6,291,597 B1 | 9/2001 | Gruber et al. | |
| 6,309,988 B1 | 10/2001 | Tsai et al. | |
| 6,326,458 B1 | 12/2001 | Gruber et al. | |
| 6,372,846 B1 | 4/2002 | McGrail et al. | |
| 6,500,563 B1 | 12/2002 | Datta et al. | |
| 6,660,211 B2 | 12/2003 | Topolkaraev et al. | |
| 6,713,175 B1 | 3/2004 | Terada et al. | |
| 6,756,331 B2 | 6/2004 | Kasemura et al. | |
| 6,811,874 B2 | 11/2004 | Tanaka et al. | |
| 6,838,403 B2 | 1/2005 | Tsai et al. | |
| 6,914,018 B1 | 7/2005 | Uitenbroek et al. | |
| 6,949,288 B2 | 9/2005 | Hodge et al. | |
| 7,135,523 B2 | 11/2006 | Ho et al. | |
| 7,157,032 B2 | 1/2007 | Eloo | |
| 7,256,223 B2 | 8/2007 | Mohanty et al. | |
| 7,354,973 B2 | 4/2008 | Flexman | |
| 7,368,503 B2 | 5/2008 | Hale | |
| 7,393,590 B2 | 7/2008 | Scheer et al. | |
| 7,514,503 B2 | 4/2009 | Nakamichi et al. | |
| 7,566,753 B2 | 7/2009 | Randall et al. | |
| 7,619,132 B2 | 11/2009 | Topolkaraev et al. | |
| 7,872,056 B2 | 1/2011 | Cheung et al. | |
| 7,977,397 B2 | 7/2011 | Cheung et al. | |
| 7,989,062 B2 | 8/2011 | Chakravarty et al. | |
| 7,994,078 B2 | 8/2011 | Reichmann et al. | |
| 8,022,139 B2 | 9/2011 | Kurihara et al. | |
| 8,026,309 B2 | 9/2011 | Halahmi et al. | |
| 8,030,382 B2 | 10/2011 | Endo et al. | |
| 8,044,134 B2 | 10/2011 | Chung et al. | |
| 8,075,994 B2 | 12/2011 | Sakamoto et al. | |
| 8,076,406 B2 | 12/2011 | Brule et al. | |
| 8,188,188 B2 | 5/2012 | Kobayashi et al. | |
| 8,236,893 B2 | 8/2012 | Nakagawa et al. | |
| 8,268,738 B2 | 9/2012 | McEneany et al. | |
| 8,268,913 B2 * | 9/2012 | Li et al. | 523/514 |
| 8,287,677 B2 | 10/2012 | Lake et al. | |
| 8,334,327 B2 | 12/2012 | Kaufman et al. | |
| 8,334,348 B2 | 12/2012 | Hogt et al. | |
| 8,362,145 B2 * | 1/2013 | Li et al. | 525/64 |
| 8,372,917 B2 * | 2/2013 | Li et al. | 525/190 |
| 8,410,215 B2 | 4/2013 | Sano et al. | |
| 8,415,008 B2 | 4/2013 | Ito et al. | |
| 8,420,193 B2 | 4/2013 | Hiruma et al. | |
| 8,444,905 B2 | 5/2013 | Li et al. | |
| 8,466,337 B2 | 6/2013 | Wang et al. | |
| 2003/0039775 A1 | 2/2003 | Kong | |
| 2003/0105231 A1 | 6/2003 | Miller | |
| 2003/0153684 A1 | 8/2003 | Miller | |
| 2003/0162013 A1 | 8/2003 | Topolkaraev et al. | |
| 2005/0112363 A1 | 5/2005 | Ning | |
| 2007/0182041 A1 | 8/2007 | Rizk et al. | |
| 2008/0042312 A1 | 2/2008 | Chen et al. | |
| 2008/0147165 A1 | 6/2008 | Hossainy et al. | |
| 2008/0287026 A1 | 11/2008 | Chakravarty et al. | |
| 2008/0311814 A1 | 12/2008 | O'Sickey et al. | |
| 2009/0060860 A1 | 3/2009 | Almenar et al. | |
| 2009/0068463 A1 | 3/2009 | Mochizuki et al. | |
| 2009/0069463 A1 | 3/2009 | Serizawa et al. | |
| 2009/0124956 A1 | 5/2009 | Swetlin et al. | |
| 2009/0274871 A1 | 11/2009 | Takahashi et al. | |
| 2009/0311937 A1 | 12/2009 | He et al. | |
| 2009/0324911 A1 | 12/2009 | Li et al. | |
| 2009/0326152 A1 * | 12/2009 | Li et al. | 525/190 |
| 2010/0048082 A1 | 2/2010 | Topolkaraev et al. | |
| 2010/0056656 A1 | 3/2010 | Matsuoka et al. | |
| 2010/0112357 A1 | 5/2010 | Fine et al. | |
| 2010/0304051 A1 * | 12/2010 | Henschke et al. | 428/17 |
| 2011/0028062 A1 | 2/2011 | Chester et al. | |
| 2011/0046281 A1 | 2/2011 | Scheer et al. | |
| 2011/0071238 A1 | 3/2011 | Bastioli et al. | |
| 2011/0132519 A1 * | 6/2011 | Li et al. | 156/60 |
| 2011/0144273 A1 | 6/2011 | Li et al. | |
| 2011/0178196 A1 | 7/2011 | Steinke et al. | |
| 2011/0190447 A1 | 8/2011 | Li et al. | |
| 2011/0195210 A1 | 8/2011 | Li et al. | |
| 2011/0245420 A1 | 10/2011 | Rasal et al. | |
| 2011/0251346 A1 | 10/2011 | Li et al. | |
| 2012/0040185 A1 | 2/2012 | Topolkaraev et al. | |
| 2012/0040582 A1 | 2/2012 | Topolkaraev et al. | |
| 2012/0080822 A1 * | 4/2012 | Li et al. | 264/328.17 |
| 2012/0214944 A1 * | 8/2012 | Li et al. | 525/186 |
| 2012/0296044 A1 * | 11/2012 | Li et al. | 525/190 |
| 2012/0296045 A1 * | 11/2012 | Li et al. | 525/190 |

FOREIGN PATENT DOCUMENTS

| | | |
|---|---|---|
| EP | 1725614 B1 | 8/2008 |
| GB | 1385105 | 2/1975 |
| WO | 9853141 A1 | 11/1998 |
| WO | 0134886 A1 | 5/2001 |
| WO | 03049589 A1 | 6/2003 |
| WO | 03066704 A1 | 8/2003 |
| WO | 2007092417 A1 | 8/2007 |
| WO | 2007115081 A2 | 10/2007 |
| WO | 2007115081 A3 | 10/2007 |
| WO | 2008020726 A1 | 2/2008 |
| WO | 2008030599 A2 | 3/2008 |
| WO | 2008030599 A3 | 3/2008 |
| WO | 2008079784 A2 | 7/2008 |
| WO | 2008079784 A3 | 7/2008 |
| WO | 2008130226 A2 | 10/2008 |
| WO | 2008130226 A3 | 10/2008 |
| WO | 2009145778 A1 | 12/2009 |
| WO | 2009151437 A1 | 12/2009 |
| WO | 2009151439 A1 | 12/2009 |
| WO | 2010002669 A1 | 1/2010 |
| WO | 2011080623 A2 | 7/2011 |
| WO | 2011080623 A3 | 7/2011 |
| WO | 2012020336 A2 | 2/2012 |
| WO | 2012020336 A3 | 2/2012 |

OTHER PUBLICATIONS

Machine Translation of JPH09059498, Mar. 4, 1997.
Machine Translation of JP2005-088600, Apr. 7, 2005.
Machine Translation of JP2007-270076, Oct. 18, 2007.
Machine Translation of JP2009-197099, Sep. 3, 2009.
Machine Translation of JP2010-001369, Jan. 7, 2010.
Machine Translation of JP2010-046852, Mar. 4, 2010.
Abstract of Korean Patent—KR20080072740, Aug. 6, 2008, 1 page.
Abstract of Korean Patent—KR20090024709, Mar. 9, 2009, 1 page.
Abstract of Korean Patent—KR20090034199, Apr. 7, 2009, 1 page.
Abstract of Article—Balakrishnan et al., "Mechanical, Thermal, and Morphological Properties of Polylactic Acid/Linear Low Density Polyethylene Blends," *Journal of Elastomers and Plastics*, vol. 42, No. 3, May 2010, pp. 223-239.
Article—Balakrishnan et al., "Novel toughened polylactic acid nanocomposite: Mechanical, thermal and morphological properties," *Materials and Design*, vol. 31, 2010, pp. 3289-3298.
Article—Chalamet et al., "Carboxyl Terminated Polyamide 12 Chain Extension by Reactive Extrusion Using a Dioxazoline Coupling Agent. Part I: Extrusion Parameters Anaylsis," *Polymer Engineering and Science*, vol. 40, No. 1, Jan. 2000, pp. 263-274.

(56) References Cited

OTHER PUBLICATIONS

Article—Chalamet et al., "Carboxyl Terminated Polyamide 12 Chain Extension by Reactive Extrusion Using a Dioxazoline Coupling Agent. Part II: Effects of Extrusion Conditions," *Polymer Engineering and Science*, vol. 40, No. 12, Dec. 2002, pp. 2317-2327.
Article—Gramlich et al., "Reactive Compatibilization of Poly(L-lactide) and Conjugated Soybean Oil, " *Macromolecules*, vol. 43, No. 5, 2010, pp. 2313-2321.
Article—Japon et al., "Reactive processing of poly(ethylene terephthalate) modified with multifunctional epoxy-based additives," *Polymer*, vol. 41, 2000, pp. 5809-5818.
Article—Jing et al., "A Bifunctional Monomer Derived from Lactide for Toughening Polylactide," *J. Am. Chem. Soc.*, vol. 130, No. 42, 2008, pp. 13826-13867.
Article—Hideko T. Oyama, "Super-tough poly(lactic acid) materials: Reactive blending with ethylene copolymer," *Polymer*, vol. 50, 2009, pp. 747-751.
Article—Robertson et al., "Toughening of Polylactide with Polymerized Soybean Oil," *Macromolecules*, vol. 43, 2010, pp. 1807-1814.
Article—Sun et al., "Toughening of poly(butylene terephthalate) with epoxy-functionalized acrylonitrile-butadiene-styrene," *Polymer*, vol. 43, 2005, pp. 7632-7643.
Article—Xanthos et al., "Reactive Modification of Polyethylene Terephthalate With Polyepoxides,"*Polymer Engineering and Science*, vol. 41, No. 4, Apr. 2001, pp. 643-655.
Article—Zhang et al., "Preparation and properties of biodegradable poly(lactic acid)/poly(butylene adipate-co-terephthalate) blend with glycidyl methyacrylate as reactive processing agent," *J. Mater. Sci.*, vol. 44, 2009, pp. 250-256.
Part of Book—Biopolymers, vol. 4, Polyester III, Applications and Commercial Products, Edited by Y. Doi and A. Steinbüchel—Polylactides by Prof. Dr. Hideto Tsuji, 2002, pp. 129-177.
Part of Book—Handbook of Plasticizers, $2^{nd}$ Edition, 2004, 2012—Theories of Cornpatability by Yu et al.
Technology Focus Report: Blends of PLA with Other Thermoplastics from NatureWorks®, Feb. 7, 2007, 6 pages.
Technology Focus Report: Toughened PLA from NatureWorks®, Mar. 1, 2007, 5 pages.
Product Information—PLA Processing Guide for Spinning Fibers from NatureWorks®, Mar. 15, 2005, 14 pages.
Product Information—NatureWorks® PLA Polymer 6201D—Fiber Melt Spinning from NatureWorks®, 2005, 3 pages.
Product Information on Lotader® AX8950, 2004, 2 pages.
Product Information—Lotader® Applications—Impact modifier for engineer plastics, Jan. 3, 2012, 1 page.
Search Report and Written Opinion for PCT/IB2013/050734 dated Jun. 27, 2013, 13 pages.
Topolkaraev et al. U.S. Appl. No. 13/370,845, filed Feb. 10, 2012, Modified Polylactic Acid Fibers.
Topolkaraev et al. U.S. Appl. No. 13/370,869, filed Feb. 19, 2012, Rigid Renewable Polyester Compositions having a High Impact Strength and Tensile Elongation Fibers.
Scholl et al. U.S. Appl. No. 13/370,883, filed Feb. 10, 2012, Renewable Polyester Compositions having a Low Density Polyetser Compositions.
Topolkaraev et al. U.S. Appl. No. 13/370,900, filed Feb. 10, 2012, Renewable Polyester Film having a Modulus and High Tensile Elongation.
Topolkaraev et al., U.S. Appl. No. 13/370,943, filed Feb. 10, 2012, Breathable Film Formed from a Renewable Polyester.
McEneany et al., U.S. Appl. No. 13/370,952, filed Feb. 10, 2012, Renewable Polymer Fibers having a low Density.

\* cited by examiner

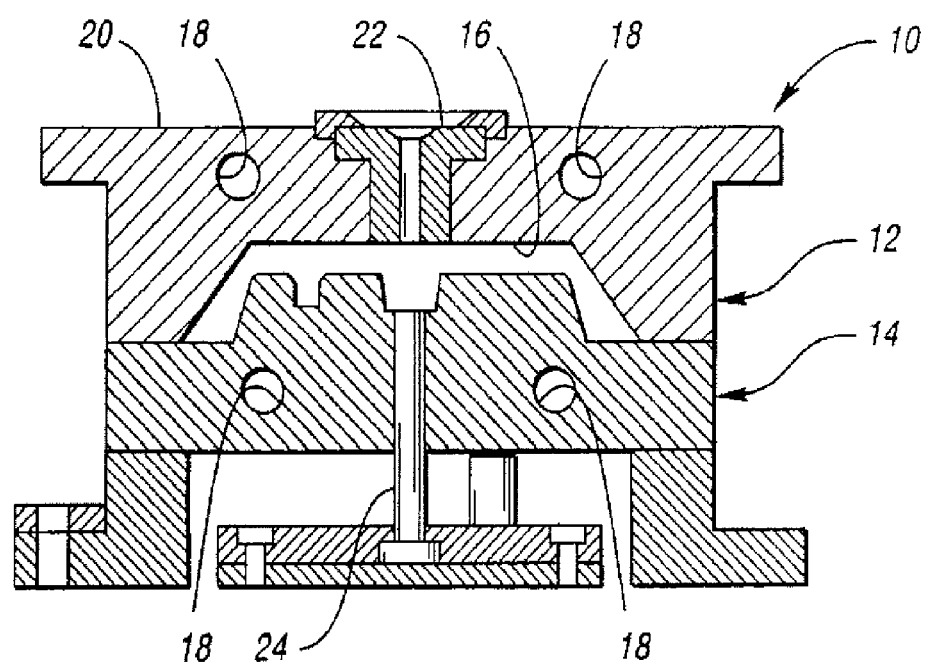

1

MOLDED PARTS CONTAINING A POLYLACTIC ACID COMPOSITION

BACKGROUND OF THE INVENTION

Injection molding is commonly used to form plastic articles that are relatively rigid in nature, including containers, medical devices, and so forth. For example, containers for stacks or rolls of pre-moistened wipes are generally formed by injection molding techniques. One problem associated with such containers, however, is that the molding material is often formed from a synthetic polymer (e.g., polypropylene or HDPE) that is not biodegradable or renewable. The use of biodegradable polymers in an injection molded part is problematic due to the difficulty involved with thermally processing such polymers. Polylactic acid, for example, tends to undergo a much greater degree of expansion during molding than other types of polymers (e.g., polyolefins). Therefore, when it is desired to form a molded part from polylactic acid, a new molding apparatus (e.g., die) is required, which is extremely costly. Furthermore, polylactic acid also has a relatively high glass transition temperature and demonstrates a high stiffness and modulus, while having a relatively low ductility. This significantly limits the use of such polymers in injection molded parts, where a good balance between material stiffness and strength is required.

As such, a need currently exists for a polylactic acid composition that is capable of exhibiting good mechanical properties so that it can be readily employed in injection molded parts.

SUMMARY OF THE INVENTION

In accordance with one embodiment of the present invention, a molded part is disclosed that is formed from a thermoplastic composition. The composition comprises from about 50 wt. % to about 95 wt. % of at least one polylactic acid having a glass transition temperature of about 40° C. or more; from about 5 wt. % to about 30 wt. % of at least one propylene/α-olefin copolymer having a propylene content of from about 60 mole % to about 90 mole % and an α-olefin content of from about 10 mole % to about 40 mole %, wherein the copolymer further has a density of from about 0.82 to about 0.90 grams per cubic centimeter; and from about 0.5 wt. % to about 20 wt. % of at least one polyolefin compatibilizer that contains a polar component. When molded into the part, the composition exhibits a degree of expansion of about 0.9% or less in a width direction.

In accordance with another embodiment of the present invention, a method for forming an injection molded part is disclosed. The method comprises injecting a thermoplastic composition, such as described herein, into a mold cavity. The thermoplastic composition is shaped into a molded part within the mold cavity.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which:

FIG. 1 is a schematic illustration of one embodiment of an injection molding apparatus for use in the present invention.

Repeat use of references characters in the present specification and drawing is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a molded part that is formed from a thermoplastic composition that contains a polylactic acid, propylene/α-olefin copolymer, and a polyolefin compatibilizer. The specific nature and concentration of the components may be selectively controlled in the present invention to achieve a composition having desirable morphological features. More particularly, the propylene/α-olefin copolymer can be dispersed as discrete physical domains within a continuous matrix of the polylactic acid. Without intending to be limited by theory, it is believed that the discrete domains can help resist the expansion of the composition during a molding operation, which minimizes the degree of expansion experienced by the composition during molding in comparison to conventional polylactic acid compositions. More particularly, when molded into a part, the present inventors have discovered that the thermoplastic composition can exhibit a degree of expansion in the width direction ("$E_w$") of about 0.9% or less, in some embodiments from about 0.1% to about 0.8%, and in some embodiments, from about 0.3% to about 0.7%, as determined in accordance with ASTM D955-08 and described herein. Among other things, this small degree of widthwise expansion minimizes the need to reconfigure and/or obtain a new molding apparatus when it is desired to use polylactic acid, which can be very costly. Furthermore, the reduced degree of expansion may also minimize the need for additional material to be injected into the molding cavity, which can even further reduce costs.

Various embodiments of the present invention will now be described in more detail.

I. Thermoplastic Composition

A. Polylactic Acid

Polylactic acid (including copolymers thereof) may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid, monomer units derived from D-lactic acid, and non-lactic acid comonomers (e.g., glycolic acid, caprolactone, etc.). Although not required, the content of one of the monomer units derived from L-lactic acid and the monomer unit derived from D-lactic add, and non-lactic acid comonomers may be about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Stereocomplexes of poly-L-lactic acid ("PLLA") and poly-D-lactic acid ("PDLA") may also be employed that can form a highly regular stereocomplex with increased crystallinity.

In one particular embodiment, the polylactic acid has the following general structure:

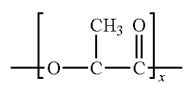

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458, which are incorporated herein in their entirety by reference thereto for all purposes.

The polylactic acid typically has a number average molecular weight ("$M_n$") ranging from about 40,000 to about 160,000 grams per mole, in some embodiments from about 50,000 to about 140,000 grams per mole, and in some embodiments, from about 80,000 to about 120,000 grams per mole. Likewise, the polymer also typically has a weight average molecular weight ("$M_w$") ranging from about 80,000 to about 200,000 grams per mole, in some embodiments from about 100,000 to about 180,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (P·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Polylactic acid is generally rigid in nature and thus has a relatively high glass transition temperature. For example, the glass transition temperature ("$T_g$") may be about 40° C. or more, in some embodiments from about 45° C. to about 80° C., and in some embodiments, from about 50° C. to about 65° C. The polylactic acid may also have a melting point of from about 140° C. to about 260° C., in some embodiments from about 150° C. to about 250° C., and in some embodiments, from about 160° C. to about 220° C. The melting temperature and glass transition temperature may be determined using differential scanning calorimetry ("DSC") in accordance with ASTM D-3417.

Some types of neat polylactic acids can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described above. Because the presence of water during melt processing can hydrolytically degrade the polylactic acid and reduce its molecular weight, it is sometimes desired to dry the polylactic acid prior to blending. In most embodiments, for example, it is desired that the polylactic acid have a moisture content of about 300 parts per million ("ppm") or less, in some embodiments about 200 ppm or less, in some embodiments from about 1 to about 100 ppm prior to blending with the propylene/α-olefin copolymer. Drying of the polylactic acid may occur, for instance, at a temperature of from about 50° C. to about 100° C., and in some embodiments, from about 70° C. to about 80° C.

Polylactic acid typically constitutes from about 50 wt. % to about 95 wt. %, in some embodiments from about 60 wt. % to about 90 wt. %, and in some embodiments, from about 70 wt. % to about 85 wt. % of the thermoplastic composition.

B. Propylene/α-Olefin Copolymer

As indicated above, the thermoplastic composition of the present invention also contains a propylene/α-olefin copolymer. The α-olefin may be a $C_2$-$C_{20}$ α-olefin, and even more particularly, a $C_2$-$C_{12}$ α-olefin. Specific examples of suitable α-olefins include ethylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; styrene; etc., as well as combinations thereof. Particularly desired α-olefin co-monomers are ethylene, 1-butene, 1-hexene, and/or 1-octene. The propylene content of such copolymers may be from about 60 mole % to about 90 mole %, in some embodiments from about 65 mole % to about 85 mole %, and in some embodiments, from about 70 mole % to about 80 mole %. The α-olefin content may likewise range from about 10 mole % to about 40 mole %, in some embodiments from about 15 mole % to about 35 mole %, and in some embodiments, from about 20 mole % to about 30 mole %.

Any of a variety of known techniques may generally be employed to form the olefin copolymers. For instance, the copolymers may be formed using a free radical or a coordination catalyst (e.g., Ziegler-Natta). Typically, however, the olefin polymer is formed from a single-site coordination catalyst, such as a metallocene catalyst. Such a catalyst system produces propylene copolymers in which the co-monomer is randomly distributed within a molecular chain and uniformly distributed across the different molecular weight fractions. Metallocene-catalysts are described, for instance, in U.S. Pat. Nos. 5,571,619 to McAlpin et al.; 5,322,728 to Davis et al.; 5,472,775 to Obileski et al.; 5,272,236 to Lai et al.; and 6,090,325 to Wheat, et al, Examples of metallocene catalysts include bis(n-butylcyclopentadienyl)titanium dichloride, bis (n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed propylene copolymers may have polydispersity numbers ($M_w/M_n$) of below 4, controlled short chain branching distribution, and controlled isotacticity.

The density of the propylene/α-olefin copolymer may be a function of both the length and amount of the α-olefin. That is, the greater the length of the α-olefin and the greater the amount of α-olefin present, the lower the density of the copolymer. Generally speaking, copolymers with a higher density are better able to retain a three-dimensional structure and create the desired morphology, while those with a lower density possess better elastomeric properties for reducing stiffness. Thus, to achieve an optimum balance between toughness and stretchability, the propylene/α-olefin copolymer is normally selected to have a density of about 0.82 grams per cubic centimeter ($g/cm^3$) to about 0.90 $g/cm^3$, in some embodiments from about 0.85 to about 0.89 $g/cm^3$, and in some embodiments, from about 0.86 $g/cm^3$ to about 0.88 $g/cm^3$. The propylene/α-olefin copolymer is also elastomeric in nature.

The propylene/α-olefin copolymer is generally immiscible with the polylactic acid. In this manner, the propylene/α-olefin copolymer can become dispersed as elastomeric discrete phase domains within a continuous phase of the polylactic acid. The discrete domains are capable of absorbing energy that arises from an external force, which can limit the degree of expansion during molding, and also increase the overall toughness and strength of the resulting material. The domains may have a variety of different shapes, such as elliptical, spherical, cylindrical, etc. In one embodiment, for example, the domains have a substantially elliptical shape. The physical dimension of an individual domain is typically small enough to minimize the propagation of cracks through the polymer material upon the application of an external stress, but large enough to initiate microscopic plastic deformation and allow for shear zones at and around particle inclusions.

In addition to the properties noted above, the mechanical characteristics of the propylene/α-olefin copolymer may also be selected to achieve the desired properties. For example, when a blend of the polylactic acid and propylene/α-olefin copolymer is applied with an external force, shear and/or plastic yielding zones may be initiated at and around the discrete phase domains as a result of stress concentrations that arise from a difference in the elastic modulus of the propylene/α-olefin copolymer and polylactic acid. Larger stress concentrations promote more intensive localized plastic flow at the domains, which allows them to become significantly elongated when stresses are imparted. These elongated domains allow the composition to exhibit a more pliable and softer behavior than the otherwise rigid polylactic acid resin. To enhance the stress concentrations, a propylene/α-olefin copolymer may be selected that has a relatively low flexural modulus in comparison to the polylactic acid. For example, the ratio of the flexural modulus of the polylactic acid to that of the propylene/α-olefin copolymer is typically from about 50 to about 500, in some embodiments from about 200 to about 450, and in some embodiments, from about 300 to about 400. The flexural modulus of the propylene/α-olefin copolymer may, for instance, range from about 0.5 to about 200 Megapascals (MPa), in some embodiments from about 1 to about 100 MPa, and in some embodiments, from about 5 to about 40 MPa, as determined in accordance with ASTM D790 at 23° C. (1% secant). To the contrary, the flexural modulus of polylactic acid is typically from about 3000 MPa to about 4000 MPa, as determined in accordance with ASTM D790 at 23° C.

The propylene/α-olefin copolymer may also exhibit an elongation at break (i.e., the percent elongation of the polymer at its yield point) greater than the polylactic acid. For example, the propylene/α-olefin copolymer of may exhibit an elongation at break of about 50% or more, in some embodiments about 100% or more, in some embodiments from about 100% to about 3000%, and in some embodiments, from about 250% to about 2500%, as determined in accordance with ASTM D412 at 23° C.

While the polymers may be immiscible, the propylene/α-olefin copolymer may be selected to have a certain melt flow rate (or viscosity) that helps ensure that the discrete domains can be adequately maintained. For example, if the melt flow rate of the propylene/α-olefin copolymer is too high, it tends to flow and disperse uncontrollably through the continuous phase. This results in lamellar or plate-like domains that are difficult to maintain and also likely to prematurely fracture. Conversely, if the melt flow rate of the propylene/α-olefin copolymer is too low, it tends to clump together and form very large elliptical domains, which are difficult to disperse during blending. This may cause uneven distribution of the propylene/α-olefin copolymer through the entirety of the continuous phase. In this regard, the ratio of the melt flow rate of the propylene/α-olefin copolymer to the melt flow rate of the polylactic acid is typically from about 0.2 to about 8, in some embodiments from about 0.5 to about 6, and in some embodiments, from about 1 to about 5. The propylene/α-olefin copolymer may, for example, have a melt flow rate of from about 0.5 to about 100 grams per 10 minutes, in some embodiments from about 1 to about 50 grams per 10 minutes, and in some embodiments, from about 5 to about 30 grams per 10 minutes, determined at a load of 2160 grams and at 230° C.

Exemplary propylene/α-olefin copolymers are also commercially available under the designations VISTAMAXX™ from ExxonMobil Chemical Co. of Houston, Tex. (e.g., 3000, 3020FL, 3980FL, 6102, and 6202); FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Other examples of suitable propylene polymers are described in U.S. Pat. Nos. 6,500,563 to Datta, et al.; 5,539,056 to Yang, et al.; and 5,596,052 to Resconi, et al.

Regardless of the materials employed, the relative percentage of the propylene/α-olefin copolymer in the thermoplastic composition is selected to achieve the desired properties without significantly impacting the biodegradability of the resulting composition. For example, the propylene/α-olefin copolymer is typically employed in an amount of from about 5 wt. % to about 40 wt. %, in some embodiments from about 10 wt. % to about 35 wt. %, and in some embodiments, from about 15 wt. % to about 30 wt. % of the thermoplastic composition, based on the weight of the polylactic acids employed in the composition. The concentration of the propylene/α-olefin copolymer in the entire thermoplastic composition may likewise constitute from about 1 wt. % to about 35 wt %, in some embodiments from about 5 wt. % to about 30 wt. %, and in some embodiments, from about 10 wt. % to about 25 wt. %.

C. Polyolefin Compatibilizer

A polyolefin compatibilizer is also employed in the thermoplastic composition to further enhance the compatibility between the polylactic acid and the propylene/α-olefin copolymer. Compatibilizers typically constitute from about 0.5 wt. % to about 30 wt. %, in some embodiments from about 1 wt. % to about 20 wt. %, and in some embodiments, from about 4 wt. % to about 15 wt. % of the thermoplastic composition.

The olefin component of the compatibilizer is non-polar and thus generally has an affinity for the non-polar propylene/α-olefin copolymer. The olefin component may generally be formed from any linear or branched α-olefin monomer, oligomer, or polymer (including copolymers) derived from an α-olefin monomer. In one particular embodiment, for example, the compatibilizer includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin co-monomers are ethylene and propylene.

In addition to the non-polar component, the polyolefin compatibilizer is also functionalized with a polar component, which can be grafted onto the polymer, incorporated as a monomeric constituent of the polymer (e.g., block or random copolymers), etc. When grafted onto a polymer backbone, particularly suitable polar groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation FUSABOND®, such as the P Series (chemically modified polypropylene), E Series (chemically modified polyethylene), C Series (chemically modified ethylene vinyl acetate), A Series (chemically modified ethylene acrylate copolymers or terpolymers), M Series (chemically modified polyethylene), or N Series (chemically modified ethylene-propylene, ethylene-propylene diene monomer ("EPDM") or ethylene-octene). Alternatively, modifier polyolefins are also available from Chemtura Corp. under the designation POLYBOND® (e.g., acrylic acid-modified polypropylene) and Eastman Chemical Company under the designation Eastman G series.

As noted above, a polar component may also be incorporated into the polyolefin compatibilizer as a monomer. For example, a (meth)acrylic monomeric component may be employed in certain embodiments. As used herein, the term "(meth)acrylic" includes acrylic and methacrylic monomers, as well as salts or esters thereof, such as acrylate and methacrylate monomers. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Other types of suitable polar monomers include ester monomers, amide monomers, etc.

In certain embodiments, the polyolefin compatibilizer may also be reactive. One example of such a reactive compatibilizer is a polyepoxide modifier that contains, on average, at least two oxirane rings per molecule. Without intending to be limited by theory, it is believed that such polyepoxide molecules can induce a reaction of the polylactic acid under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of the polylactic acid (esterification) or via a hydroxyl group (etherification). Oxazoline side reactions may likewise occur to form esteramide moieties. Through such reactions, the molecular weight of the polylactic acid may be increased to counteract the degradation often observed during melt processing. While it is desirable to induce a reaction with the polylactic acid as described above, the present inventors have discovered that too much of a reaction can lead to crosslinking between polylactic acid backbones. If such crosslinking is allowed to proceed to a significant extent, the resulting polymer blend can become brittle and difficult to shape into a material with the desired strength and elongation properties.

In this regard, polyepoxide modifiers having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide modifier of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide modifier may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide modifier contains at least one epoxy-functional (meth)acrylic monomeric component and at least one olefinic monomeric component, such as described above. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it can not only result in chain extension of the polylactic acid, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers that are not epoxy-functional as described above, amide monomers, etc. In one particularly desirable embodiment of the present invention, for example, the polyepoxide modifier is a terpolymer formed from an epoxy-functional (meth)acrylic monomeric component, α-olefin monomeric component, and non-epoxy functional (meth)acrylic monomeric component. The polyepoxide modifier may be poly(ethylene-co-methylacrylate-co-glycidyl methacrylate), which has the following structure:

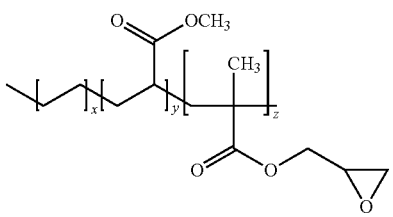

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164, which is incorporated herein in its entirety by reference thereto for all purposes. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the polylactic acid, but too high of a content may reduce the melt flow rate to such an extent that the polyepoxide modifier adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide modifier that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %.

In addition to controlling the type and relative content of the monomers used to form the polyepoxide modifier, the overall weight percentage may also be controlled to achieve the desired benefits. For example, if the modification level is too low, the desired increase in melt strength and mechanical properties may not be achieved. However, if the modification level is too high, molding may be restricted due to strong molecular interactions (e.g., crosslinking) and physical network formation by the epoxy functional groups. Thus, the polyepoxide modifier is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the polylactic acids employed in the composition. The polyepoxide modifier may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive polyolefin compatibilizers may also be employed in the present invention, such as oxazoline-functionalized polyolefins, cyanide-functionalized polyolefins, etc. When employed, such reactive compatibilizers may be employed within the concentrations noted above for the polyepoxide modifier. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof. Regardless of the particular type(s) employed, the polyolefin compatibilizer may also influence the morphology of the thermoplastic composition. More particularly, the resulting morphology may have a plurality of discrete domains of the compatibilizer distributed throughout a continuous polylactic acid matrix that can further help limit the degree of expansion of the composition during molding. These "secondary" domains may have a variety of different shapes, such as elliptical, spherical, cylindrical, etc. Regardless of the shape, however, the size of an individual secondary domain, after blending, is small to provide an increased surface area for interfacing with the polylactic acid and propylene/α-olefin copolymer. For example, the size of a secondary domain (e.g., length) typically ranges from about 10 to about 1000 nanometers, in some embodiments from about 20 to about 800 nanometers, in some embodiments from about 40 to about 600 nanometers, and in some embodiments from about 50 to about 400 nanometers. As noted above, the propylene/α-olefin copolymer may also form discrete domains within the polylactic acid matrix, which are considered in the "primary" domains of the composition. Of course, it should be also understood that domains may be formed by a combination of the compatibilizer, propylene/α-olefin copolymer, and/or other components of the blend.

D. Other Components

One beneficial aspect of the present invention is that good mechanical properties (e.g., elongation) may be provided without the need for conventional plasticizers, such as solid or semi-solid polyethylene glycol, such as available from Dow Chemical under the name Carbowax™). The thermoplastic composition may be substantially free of such plasticizers. Nevertheless, it should be understood that plasticizers may be used in certain embodiments of the present invention. When utilized, however, the plasticizers are typically present in an amount of less than about 10 wt. %, in some embodiments from about 0.1 wt. % to about 5 wt. %, and in some embodiments, from about 0.2 wt. % to about 2 wt. % of the thermoplastic composition. Of course, other ingredients may be utilized for a variety of different reasons. For instance, materials that may be used include, without limitation, catalysts, pigments, antioxidants, stabilizers, surfactants, waxes, solid solvents, fillers, nucleating agents (e.g., titanium dioxide, calcium carbonate, etc.), particulates, and other materials added to enhance the processability of the thermoplastic composition. When utilized, it is normally desired that the amounts of these additional ingredients are minimized to ensure optimum compatibility and cost-effectiveness. Thus, for example, it is normally desired that such ingredients constitute less than about 10 wt. %, in some embodiments less than about 8 wt. %, and in some embodiments, less than about 5 wt. % of the thermoplastic composition.

II. Blending

The raw materials (e.g., polylactic acid, propylene/α-olefin copolymer, and compatibilizer) may be blended using any of a variety of known techniques. In one embodiment, for example, the raw materials may be supplied separately or in combination. For instance, the raw materials may first be dry mixed together to form an essentially homogeneous dry mixture. The raw materials may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the raw materials may be fed to the same or different feeding ports of the twin-screw extruder and melt blended to form a substantially homogeneous melted mixture. If desired, other additives may also be injected into the polymer melt and/or separately fed into the extruder at a different point along its length. Alternatively, the additives may be pre-blended with the polylactic acid, propylene/α-olefin copolymer, and/or compatibilizer.

Regardless of the particular processing technique chosen, the raw materials are blended under sufficient shear/pressure and heat to ensure sufficient dispersion, but not so high as to adversely reduce the size of the discrete domains. For example, blending typically occurs at a temperature of from about 180° C. to about 260° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 500 revolutions per minute ("rpm"), in some embodiments from about 70 to about 300 rpm, and in some embodiments, from about 100 to about 200 rpm. This may result in a temperature that is sufficient high to disperse the propylene/α-olefin copolymer without adversely impacting the size of the resulting domains. The melt shear rate, and in turn the degree to which the polymers are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Molded Parts

As indicated above, the propylene/α-olefin copolymer can be dispersed within the thermoplastic composition as discrete domains within a continuous phase of the polylactic acid. When applied with an external force, shear and/or plastic yielding zones may be initiated at and around the discrete phase domains as a result of stress concentrations. Among other things, this promotes more intensive localized plastic flow at the domains, which allows them to become significantly elongated when stresses are imparted. These elongated domains allow the composition to exhibit a more pliable and softer behavior than the otherwise rigid polylactic acid resin, resulting in improved tensile elongation properties for the molded part. The part may, for instance, possess a tensile elongation at break that is relatively high, such as about 6% or more, in some embodiments about 7% or more, and in some embodiments, from about 8% to about 50%, as determined in accordance with ASTM D638-10 at 23° C. While achieving a very high degree of tensile elongation, other mechanical properties are not adversely affected. For example, the part may exhibit a peak stress (tensile strength) of from about 15 to about 60 Megapascals ("MPa"), in some embodiments from about 20 to about 55 MPa, and in some embodiments, from about 25 to about 50 MPa; a break stress of from about 10 to about 50 Megapascals ("MPa"), in some embodiments from about 15 to about 45 MPa, and in some embodiments, from about 20 to about 40 MPa; and/or a tensile modulus of from about 0.1 to about 3.4 Gigapascals ("GPa"), in some embodiments from about 0.5 GPa to about 3.2 GPa, and in some embodiments, from about 2.0 GPa to about 3.0 GPa. The tensile properties may be determined in accordance with ASTM D638-10 at 23° C.

Due to its unique and beneficial properties, the thermoplastic composition of the present invention is well suited for use in molded parts having a relatively small thickness. For example, the article may have a thickness of about 100 micrometers to about 50 millimeters, in some embodiments from about 200 micrometers to about 10 millimeters, in some embodiments from about 400 micrometers to about 5 millimeters, and in some embodiments, from about 500 micrometers to about 2 millimeters.

The molded part may be formed using any of a variety of techniques known in the art, such as extrusion blow molding, injection molding, rotational molding, compression molding, etc., as well as combinations of the foregoing. Regardless of the process selected, the thermoplastic composition may be used alone to form the part, or in combination with other polymeric components to form a molded part. For example, other polymer(s) may be injected or transferred into a mold during an injection molding process to form a skin layer around a core. Examples of machines suitable for co-injection, sandwich or two-component molding include machines produced by Presma Corp., Northeast Mold & Plastics, Inc. Although not required, the core of such a part is typically formed from the thermoplastic composition of the present invention and the skin layer is typically formed from a different polymer (e.g., polyolefins, polyesters, polyamides, etc.) that enhances surface and bulk and bonding properties for intended use.

Referring to FIG. 1, for example, one particular embodiment of a single-component injection molding apparatus or tool 10 that may be employed in the present invention is shown in more detail. In this embodiment, the apparatus 10 includes a first mold base 12 and a second mold base 14, which together define an article or component-defining mold cavity 16. Each of the mold bases 12 and 14 includes one or more cooling lines 18 through which a cooling liquid such as water flows to cool the apparatus 10 during use. The molding apparatus 10 also includes a resin flow path that extends from an outer exterior surface 20 of the first mold half 12 through a sprue 22 to the mold cavity 16. The resin flow path may also include a runner and a gate, both of which are not shown for purposes of simplicity. The molding apparatus 10 also includes one or more ejector pins 24 slidably secured within the second mold half 14 that helps to define the mold cavity 16 in the closed position of the apparatus 10, as indicated in FIG. 1. The ejector pin 24 operates in a well known fashion to remove a molded part from the cavity 16 in the open position of the molding apparatus 10.

The thermoplastic composition may be directly injected into the molding apparatus 10 using techniques known in the art. For example, the molding material may be supplied in the form of pellets to a feed hopper attached to a barrel that contains a rotating screw (not shown). As the screw rotates, the pellets are moved forward and undergo extreme pressure and friction, which generates heat to melt the pellets. Electric heater bands (not shown) attached to the outside of the barrel may also assist in the heating and temperature control during the melting process. For example, the bands may be heated to a temperature of from about 200° C. to about 260° C., in some embodiments from about 230° C. to about 255° C., and in some embodiments, from about 240° C. to about 250° C. Upon entering the molding cavity 16, the molding material is solidified by the cooling liquid flowing through the lines 18. The cooling liquid may, for example, be at a temperature (the "molding temperature") of from about 5° C. to about 50° C., in some embodiments from about 10° C. to about 40° C., and in some embodiments, from about 15° C. to about 30° C.

The molded parts may have a variety of different sizes and configurations. For instance, the molded part may be used to form dispensers (e.g., for paper towels), packaging materials (e.g., food packaging, medical packaging, etc.), medical devices, such as surgical instruments (e.g., scalpels, scissors, retractors, suction tubes, probes, etc.); implants (e.g., bone plates, prosthetics, plates, screws, etc.); containers or bottles; and so forth. The molded part may also be used to form various parts used in "personal care" applications. For instance, in one particular embodiment, the molded part is used to form one or multiple portions of a container. The configuration of the container may vary as is known in the art, such as described in U.S. Pat. Nos. 5,687,875 to Watts, et al.; 6,568,625 to Faulks, et al.; 6,158,614 to Haines, et al.; 3,973,695 to Ames; 6,523,690 to Buck, et al.; and 6,766,919 to Huang, et al., which are incorporated herein in their entirety by reference thereto for all purposes. Wipes for use with the container, e.g., wet wipes, may be arranged in any manner that provides convenient and reliable dispensing and that assists the wet wipes in not becoming overly dry. For example, the wet wipes may be arranged in the container as a plurality of individual wipes in a stacked configuration to provide a stack of wet wipes that may or may not be individually folded. The wet wipes can be individual wet wipes which are folded in a c-fold configuration, z-fold configuration, connected to adjacent wipes by a weakened line or other non-interfolded configurations as are known to those skilled in the art. Alternatively, the individual wet wipes can be interfolded such that the leading and trailing end edges of successive wipes in the stacked configuration overlap. In each of these non-interfolded and interfolded configurations, the leading end edge of the following wet wipe is loosened from the stack by the trailing end edge of the leading wet wipe as the leading wet wipe is removed by the user from the dispenser or package. For example, representative wet wipes for use with the invention are described in U.S. Pat. Nos. 6,585,131 to Huang, et al. and 6,905,748 to Sosalla, which are incorporated herein in their entirety by reference thereto for all purposes.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C. or 230° C. Unless otherwise indicated, melt flow rate is measured in accordance with ASTM Test Method D1239 with a Tinius Olsen Extrusion Plastometer.

Thermal Properties:

The melting temperature and glass transition temperature may be determined by differential scanning calorimetry (DSC). The differential scanning calorimeter may be a DSC Q100 Differential Scanning calorimeter, which was outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools are used. The samples are placed into an aluminum pan and weighed to an accuracy of 0.01 milligram on an analytical balance. A lid is crimped over the material sample onto the pan. Typically, the resin pellets are placed directly in the weighing pan.

The differential scanning calorimeter is calibrated using an indium metal standard and a baseline correction is performed, as described in the operating manual for the differential scanning calorimeter. A material sample is placed into the test chamber of the differential scanning calorimeter for testing, and an empty pan is used as a reference. All testing is run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. All testing is run with a 55-cubic centimeter per minute nitrogen (industrial grade) purge on the test chamber.

The results are evaluated using the UNIVERSAL ANALYSIS 2000 analysis software program, which identified and quantified the glass transition temperature ($T_g$) of inflection, the endothermic and exothermic peaks, and the areas under the peaks on the DSC plots. The glass transition temperature is identified as the region on the plot-line where a distinct change in slope occurred, and the melting temperature is determined using an automatic inflection calculation.

Degree of Expansion

The degree of expansion of injection mold parts was determined by following ASTM D955-08 Standard Test Method of Measuring Shrinkage from Mold Dimensions of Thermoplastics. The injection mold cavity had a length ($L_m$) dimension of 126.78 mm and a width ($W_m$) dimension of 12.61 mm, which conforms to the ASTM D955-08 Type A specimen. The average length ($L_s$) and width ($W_s$) of five (5) test specimens were measured after 24±1 hour, 48±1 hour, or 96±1 hour after specimens had been removed from the mold. The shrinkage in the length direction ($S_l$) was calculated by $S_l = (L_m - L_s) \times 100 / L_m$ and the shrinkage of the width direction ($S_w$) was calculated by $S_w = (W_m - W_s) \times 100 / W_m$. Because negative shrinkage values represent expansion of the part, the degree of expansion in the width direction ("$E_i$") is equal to $-S_w$ and the degree of expansion in the length direction ("$E_l$") is equal to $-S_l$.

EXAMPLES 1-6

A material was formed by melt blending polylactic acid (PLA 3001D, Natureworks®), an α-olefin/propylene copolymer, and compatibilizer. The copolymer was VISTAMAXX™ 6202 ("VM") (ExxonMobil), which is a polyolefin copolymer/elastomer with a melt flow rate of 18 g/10 min (230° C., 2160 g) and a density of 0.861 g/cm³. The compatibilizer was Fusabond™ 353D (DuPont), which is a maleated polyethylene-based compatibilizer. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 7 zones, numbered consecutively 1-7 from the feed hopper to the die. The first barrel zone #1 received the resins via three gravimetric feeders (K-Tron) at a total throughput as specified in the table below. The die used to extrude the resin had 3 die openings (6 millimeters in diameter) that were separated by 4 millimeters. Upon formation, the extruded resin was cooled on a 15-ft air cooling belt equipped with several fans and formed into pellets by a Conair pelletizer. The extruder screw speed was 150 revolutions per minute ("rpm"). The set temperature profile was 140° C., 160° C., 170° C., 180° C., 180° C., 175° C., 170° C. for zones 1 through 7, respectively. The process conditions are summarized in Table 1.

TABLE 1

| | | | | | | Processing Conditions | | | | | | | |
|---|---|---|---|---|---|---|---|---|---|---|---|---|---|
| Ex | Fusabond lb/hr | VM lb/hr | PLA lb/hr | $T_1$ (° C.) | $T_2$ (° C.) | $T_3$ (° C.) | $T_4$ (° C.) | $T_5$ (° C.) | $T_6$ (° C.) | $T_7$ (° C.) | $T_{melt}$ (° C.) | $P_{melt}$ (psi) | Torque (%) |
| 1 | 2.0 | 4.0 | 16.0 | 165 | 171 | 175 | 180 | 181 | 175 | 170 | 185 | 10 | 46-51 |
| 2 | 1.0 | 4.0 | 16.0 | 165 | 170-171 | 175 | 180-181 | 180 | 175 | 170 | 183-184 | 20 | 48-53 |
| 3 | 0.5 | 4.0 | 16.0 | 165-166 | 170-171 | 175 | 180 | 180-181 | 175 | 170 | 184 | 30 | 48-53 |
| 4 | 0.5 | 2.0 | 18.0 | 165 | 170 | 175 | 180 | 180 | 175 | 170 | 183-184 | 60 | 51-56 |
| 5 | 1.0 | 2.0 | 18.0 | 165 | 170 | 175 | 179-180 | 180 | 175 | 170 | 184 | 50 | 49-55 |
| 6 | 2.0 | 2.0 | 18.0 | 165-166 | 170 | 175 | 179-180 | 180 | 175 | 170 | 184 | 30 | 46-53 |

Tensile Properties:

Tensile properties were determined by following ASTM D638-10 guidelines. ASTM D638-10 Type V injection molded test specimens were pulled via a MTS Mold 810 tensile frame with a 3,300 pound load cell. Five specimens were pulled from each example. The average values for peak stress (tensile strength), break stress, modulus, and elongation at break were reported.

All of the resulting polymer strands were off white in color/translucent with a smooth shiny surface. The polymer strands also exhibited good flexibility when bent.

EXAMPLE 7

Samples from Examples 1-6 and a 100% PLA control were molded into tensile bars (length of 126.78 mm and width of 12.61 mm) using a Boy Machine 22 ton injection molding press. The press had an ASTM test specimen mold with four (4) cavities. The temperature profile was 210° C., 215° C., 218° C. and 220° C. for zones 1 through 4. The mold was set at 75° F. and the cycle time was 45 seconds. Once formed, the specimens were tested for mold shrinkage and tensile properties (ASTM D638). The results are provided below in Tables 2 and 3.

TABLE 2

Degree of Expansion

| Example | $S_w$ | $E_w$ | $S_l$ | $E_l$ |
|---|---|---|---|---|
| Control | −0.96% | +0.96% | +0.23% | −0.23% |
| 1 | −0.38% | +0.38% | +0.28% | −0.28% |
| 2 | −0.47% | +0.47% | +0.28% | −0.28% |
| 3 | −0.57% | +0.57% | +0.26% | −0.26% |
| 4 | −0.58% | +0.58% | +0.23% | −0.23% |
| 5 | −0.66% | +0.66% | +0.24% | −0.24% |
| 6 | −0.61% | +0.61% | +0.22% | −0.22% |

TABLE 3

Tensile Properties

| Example | Tensile Strength (MPa) | % Elongation at break | Modulus (GPa) | Break Stress (Mpa) | % Elongation at yield |
|---|---|---|---|---|---|
| Control | 58.1 | 5.37% | 3.4 | 51.0 | 2.9 |
| 1 | 39.6 | 9.4% | 2.4 | 21.2 | 2.1 |
| 2 | 38.4 | 8.6% | 2.3 | 19.9 | 2.1 |
| 3 | 37.0 | 11.2% | 2.3 | 18.9 | 2.0 |
| 4 | 48.7 | 7.1% | 2.9 | 34.2 | 2.1 |
| 5 | 48.0 | 6.8% | 2.8 | 34.4 | 2.1 |
| 6 | 45.6 | 5.7% | 2.6 | 34.8 | 2.2 |

As shown in Table 2, the PLA control had a degree of expansion in the width direction of 0.96%. This makes the PLA molded material difficult to fit in the same mold for secondary injection due to the increased sample size. Samples 1-6, on the other hand, had a significantly reduced expansion in the width direction. Further, even with this reduced expansion, Samples 1-6 were able to retain excellent mechanical properties. As shown in Table 3, for instance, increasing the amount of compatibilizer increased the modulus nearly linearly, which indicates that the compatibilizer may helped to improve the dispersion of polyolefin elastomer and result in less stiff molded parts. The elongation-at-break also showed that the ductility of the samples initially increased with compatibilizer level and then it decreased, with 2.5% sample had the highest elongation at break.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A molded part that is formed from a thermoplastic composition, wherein the thermoplastic composition comprises:
   from about 50 wt. % to about 95 wt. % of at least one polylactic acid having a glass transition temperature of about 40° C. or more;
   from about 5 wt. % to about 30 wt. % of at least one propylene/α-olefin copolymer having a propylene content of from about 60 mole % to about 90 mole % and an α-olefin content of from about 10 mole % to about 40 mole %, wherein the copolymer further has a density of from about 0.82 to about 0.90 grams per cubic centimeter; and
   from about 0.5 wt. % to about 20 wt. % of at least one polyolefin compatibilizer that contains a polar component;
   wherein the part exhibits a degree of expansion of about 0.9% or less in a width direction, as determined in accordance with ASTM D955-08.

2. The molded part of claim 1, wherein the part exhibits a degree of expansion of from 0.3% to about 0.7% in the width direction.

3. The molded part of claim 1, wherein the thermoplastic composition has a morphology in which a plurality of discrete primary domains are dispersed within a continuous phase, the domains containing the propylene/α-olefin copolymer and the continuous phase containing the polylactic acid.

4. The molded part of claim 1, wherein the polylactic acid has a glass transition temperature of from about 50° C. to about 65° C.

5. The molded part of claim 1, wherein the α-olefin of the copolymer is ethylene, 1-octene, 1-hexene, 1-butene, or a combination thereof.

6. The molded part of claim 1, wherein the propylene content of the copolymer is from about 70 mole % to about 80 mole % and the α-olefin content of the copolymer is from about 20 mole % to about 30 mole %.

7. The molded part of claim 1, wherein the copolymer has a density of from about 0.86 to about 0.88 grams per cubic centimeter.

8. The molded part of claim 1, wherein the copolymer has a melt flow rate of from about 1 to about 50 grams per 10 minutes, determined at a load of 2160 grams and a temperature of 230° C. in accordance with ASTM D1238-E.

9. The molded part of claim 1, wherein the copolymer is metallocene-catalyzed.

10. The molded part of claim 1, wherein the copolymer is elastomeric.

11. The molded part of claim 1, wherein the copolymer exhibits a flexural modulus of from about 1 about 100 Megapascals, determined in accordance with ASTM D790 at 23° C.

12. The molded part of claim 1, wherein the polar component is grafted onto a polyolefin backbone.

13. The molded part of claim 12, wherein the polar component includes maleic anhydride.

14. The molded part of claim 1, wherein the polar component is a monomeric constituent of the polyolefin compatibilizer.

15. The molded part of claim 14, wherein the polar component includes a (methy)acrylic monomeric constituent.

16. The molded part of claim 1, wherein the molded part exhibits a tensile modulus of from about 2.0 to about 3.0 Gigapascals measured at 23° C. according to ASTM D638-10.

17. A container comprising the molded part of claim 1.

18. The container of claim 17, wherein the container is configured to receive a plurality of wipes.

* * * * *